Patented Feb. 22, 1949

2,462,597

UNITED STATES PATENT OFFICE 2,462,597

AMINO ACID SEPARATION

Richard J. Block, Scarsdale, N. Y., assignor to C. M. Armstrong, Inc., a corporation of New York No Drawing. Application February 25, 1946, Serial No. 650,121

3 Claims. (Cl. 260—529)

This invention relates to the treatment of polyamino acids and, more particularly, to the method of separating essential polyamino acids from protein hydrolysates in a convenient and economical manner.

The polyamino acids, that is, those containing a plurality of nitrogen atoms to the molecule, and that are essential in animal nutrition, are arginine, lysine, histidine, and tryptophane. Tryptophane, however, is destroyed during acid hydrolysis and is not present in appreciable amounts in the acid protein hydrolysates to the treatment of which the present invention is primarily directed. These acids are herein referred to as essential polyamino acids even though only one of the nitrogen atoms of histidine occurs in an amino group.

This application is a continuation in part of my copending application for U. S. Patent Serial No. 505,243, filed October 6, 1943, now abandoned, and entitled Amino acid separation, which in turn is a continuation in part of my application Serial No. 481,787, filed April 3, 1943 and entitled Amino acid separation, issued on October 30, 1945 as Patent No. 2,387,824.

In the said patent there is described a method of separating monoamino acids from polyamino acids. In the preferred embodiment, that method includes liberating the polyamino acids by means of sulfuric acid from a cation exchanger upon which the polyamino acids are absorbed. This step produces an elutriate consisting of a solution of the desorbed polyamino acids in impure form.

In the new method of the present invention, the adsorbed polyamino acids are desorbed by a weak base which, in turn, may be liberated by treatment with a fresh supply of protein hydrolysate from which polyamino acids are to be separated or by treatment with dilute sulfuric acid or like acid. Ammonia, for instance, requires for its liberation only about a fifth as much sulfuric acid as do the amino acids if liberated directly by sulfuric acid or the like.

In other words, the ammonium hydroxide or like weak base which is used to liberate or desorb the polyamino acids from the cation exchanger is itself more easily desorbed by sulfuric acid than are the polyamino acids. If, for convenience, it is considered, because of the liberation of the amino acids by ammonia, that the ammonia has higher "affinity" for the exchanger, then it would be reasonable to assume that the ammonia once adsorbed on the cation exchanger would be more difficult to liberate than the amino acids. This, however, is contrary to the results now found; the ammonia is more readily desorbed by means of sulfuric acid than are the polyamino acids which the ammonia has originally replaced. This result is all the more surprising because the capacity of the exchanger for ammonia is approximately 10 times that for the polyamino acids on the basis of molality.

Briefly stated, the invention comprises treatment of a cation exchanger with a solution of polyamino acids and liberating the thus adsorbed amino acids from the exchanger by elutriation with aqueous solution of a weak base, the exchanger being then reused directly with a fresh portion of acid amino acid solution or placed in condition for reuse by treatment with an excess of dilute sulfuric acid or like acid solution. The invention comprises also the recovery of polyamino acids from the elutriate so obtained. In one embodiment, the invention comprises fractionally desorbing the polyamino acids from the exchanger by means of pyridine or like organic base and then with ammonium hydroxide solution.

The exchanger used in this synthesis or for the separations herein referred to is a synthetic cation exchanger, adjusted either to the acid cycle or to the ammonia cycle.

More specifically the exchanger used is one of those that is known to be active in the cation exchange reactions. The exchanger may be any one of the class described in my application for U. S. Patent Serial No. 446,840, filed June 12, 1942, for Separation of mineral acids from amino acids now abandoned. Thus, there may be used to advantage such resin exchangers as the phenolic formaldehyde sulfonic acid ion exchange resins.

The rate of passage over the exchanger of the solution of amino acids to be separated from each other is such as to give a substantial time of contact with the exchanger, say, 0.5 to 10 minutes or more and ordinarily 0.5 to 4.5 minutes, at room temperatures initially.

In the preferred embodiment of the invention the exchanger, before contact with the polybasic amino acids, is adjusted to the acid cycle as by treatment with strong acid such as a 1.5 to 10% aqueous solution of hydrochloric or sulfuric acid or other acid that is stronger than the amino acids. The amount of acid contacted with the exchanger in this regeneration step is preferably adequate to lower the pH of the effluent from the column to about 1 or less. The column is then washed with water to remove most of the excess of regenerating acid.

The exchanger is ordinarily used in solid granular form and before use is filled into a container. A tower is a particularly suitable form, as, for example, one which is about 1 to 3 feet long for laboratory use and 2 to 20 feet or so for large scale plant operations.

As the source of amino acids to be recovered there is used to advantage any solution containing essential polyamino acids. A solution that is particularly suitable is one made as described in my said application for U. S. Patent Serial No. 466,217, now Patent No. 2,386,926. Thus there may be used a solution of the hydrochloric acid salts of the amino acids, made by the acid hydrolysis of proteins. Sulfuric acid hydrolysates also may be used. Also the monoamino acids may first be separated from the polyamino acids as described in my said Patent 2,387,824, although for purposes of the present invention this separation may be effected as one of the first steps in the recovery of the polybasic amino acids.

The contact of the cation exchanger with the amino acid solutions and the desorbing and regenerating agents such as ammonium hydroxide and sulfuric acid solution may be and preferably are effected at approximately room temperatures. At such temperatures the reactions proceed smoothly and conveniently.

As contacted with the exchanger, the amino acid solution should be of relatively low concentration and suitably at a concentration corresponding to not substantially more than 1.5 parts of amino acid nitrogen for 100 parts of solution. At higher concentrations amino acids leak through the exchangers. At the same time the concentration of the solution should not be so low that the volume of the hydrolysate to be handled is one that is impracticable. Thus, concentrations ranging from about 0.1 to 2.0 are satisfactory all things considered, although solutions of about 0.4 to 0.8% concentration expressed as nitrogen are particularly advantageous.

The hydrolysate should be substantially free of metal cations, so as to avoid later difficulties in purification of the amino acids. While a pH of the influent of 2 to 3 is particularly desirable, the pH may be varied, as from about 0.5 to 11. For best yields, the pH of the effluent at the time the column is saturated with polyamino acids, that is, just before the column is washed thoroughly with water preparatory to washing with the elutriating material, should be approximately the same as the pH of the influent. The treatment of the cation exchanger with the acidic solution of the amino acids is continued until the effluent from the exchanger, when the exchanger is used in the form of a filling for a column and the amino acid solution is percolated therethrough, shows with phospho-24-tungstic acid polyamino acids coming through or until the pH of the effluent approaches the pH of the influent. At this state essential monoamino acids, if any were present in the original hydrolysate are mostly in the effluent and the column and exchanger is largely saturated with polyamino acids as shown by those acids beginning to come through in substantial proportion in the effluent.

After the treatment with the polyamino acids to the approximate pH described, it is preferred but not absolutely necessary to wash the exchanger with water adequate in amount to wet all the surfaces and remove, when the water is drained, most of the materials present that are not adsorbed but are simply held mechanically. In addition, the water may remove loosely adsorbed monoamino acids. The amount of water used in this washing is suitably about the volume of the amino acid solution originally used as the influent to the column of cation exchanger.

When the exchanger has been practically saturated with the polyamine acids and washed as described, then it is contacted with the aqueous solution of ammonium hydroxide of a concentration that is 1 to 10% by weight and preferably 3 to 7%. This ammonium hydroxide is passed over the exchanger, say, in the form of column filling, so that the period of contact of ammonium hydroxide solution with the exchanger averages about 2 to 5 minutes or so.

The contact with the ammonia is continued until a test of the effluent shows that the pH is approximately the same although perhaps slightly lower than the value of the influent ammonium hydroxide, say at a pH of 10 to 12. This shows that the ammonium hydroxide is coming through in quantity. In most cases completeness of elution is judged by removal of color of the protein hydrolysate. The column is then drained.

The column is then preferably rinsed with water and the washing is kept separate from the effluent obtained in the ammonium hydroxide treatment.

This said elutriate is usually highly colored due to colored materials of the protein hydrolysate used as the source of amino acid. The excess ammonia in this effluent is removed in any convenient manner, such as steam distillation, concentration in vacuo, etc. This leaves the amino acids in condition practically uncontaminated by resin, degradation or other products.

The evaporated material is redissolved in sufficient water to form a solution with the polyamino acids and then adjusted to a pH of about 4, as by neutralizing with hydrochloric, sulfuric, acetic, or like acid. At this pH there is caused coalescence of certain impurities. These then may be filtered off and the filtrate, initially colored, decolorized with usual decolorizing agents.

In place of the ammonium hydroxide described as the agent to liberate the polyamino acids from the exchanger, there may be used an aqueous solution of another weak alkali, as for example, morpholine, sodium triphosphate, or potassium carbonate, say in 2 to 10% concentration. Organic bases that are weaker than ammonium hydroxide, as for instance, pyridine or aniline, either alone for liberating histidine or followed by ammonium hydroxide for subsequent liberation of arginine and lysine, may also be used.

When blood has been used as the source of protein and hydrolyzed by acid under usual conditions for making acid hydrolysates of protein, the purified amino acid mixture recovered, after the exchanger in the column has been repeatedly reused, has been found to contain the following approximate percentages of acid materials, free or combined, on the dry basis:

| | Per cent |
|---|---|
| Lysine | 30 |
| Histidine | 16 |
| Arginine | 13 |
| Monoamino acids | 30 |
| Total mineral acid calculated as hydrogen chloride | 10 |

In the regeneration of the exchanger after the ammonium hydroxide treatment, to place the exchanger in condition for reuse, the exchanger is suitably washed with a small amount of water and then with a dilute aqueous solution of sulfuric, hydrochloric, or like mineral acid, say in a concentration of 1 to 10% and preferably 3 to 6%. The regenerating acid solution is flowed over the exchanger slowly until the effluent comes to have a pH of about 0.8 to 1, or until it is negative to the phospho-24-tungstic acid test as applied in this case for ammonia. Under these conditions some arginine and lysine remain adsorbed on the exchanger, unless and until the column has been reused for a number of times. The column retains some arginine and lysine, even after the ammonia and acid treatments. The amount of lysine and arginine originally present in the system above this said level is liberated in the next treatment with ammonium hydroxide, as described above.

The acid washed exchanger may be washed with a little water and drained to remove most of the free regenerating acid before the column is placed in use with a fresh supply of the solution of amino acids. Drainage alone may be used in place of the water washing. This adjusts the exchanger to the acid cycle.

In another embodiment of the invention the washing with the sulfuric acid or the like during the regeneration of the exchanger is dispensed with. In this embodiment the column after the desorption by ammonium hydroxide is washed with water until the free ammonia is largely removed. Then the column is treated with an amino acid solution or protein hydrolysate of the kind described, say at a pH of about 0.5 to 3. During this treatment with the amino acid solution, the pH of the effluent from the exchanger drops from a pH of say 10, for the foreshot through, to below 4 and ordinarily to about 2 to 3. Under such conditions the monoamino acids are largely eliminated from the column and the polyamino acids absorbed on the cation exchanger. The exchanger so restored to use and built up in concentration of the polyamino acids is then subjected to treatment with a fresh supply of ammonium hydroxide such, for example, as a 4% aqueous solution, to replace the sorbed polyamino acids as described above. In any case, the effluent obtained by the desorption of the polyamino acids from the exchanger is treated to produce the polyamino acids. Thus, the ammonia is suitably removed from the effluent, the solution then adjusted to a pH that is suitably about 4, filtered, decolorized if desired, and again evaporated to dryness.

Products so made are low in ash and contain the amino acids or peptides as the hydrochlorides etc. (acid salts) as distinguished from the salts with sodium or other metals.

The invention will be further illustrated by detailed description in connection with the following specific examples.

Example 1

4.5 liters of a partially neutralized sulfuric acid hydrolysate of animal blood, containing 1.79 mgs. of amino acids calculated as nitrogen per cc., was run at pH 2.8 through a 2 x 11 inch column of the phenolic formaldehyde sulfonic acid ion exchange resin at the rate of 150 cc. per minute. The pH of the effluent dropped gradually to 1.4 and then rose again to pH 2.6 when a positive test for polyamino acids was first given by the effluent.

The column was then washed with water equal in volume to the total amount of blood hydrolysate that had been put through.

The washed column was then treated with 5% by weight of ammonia. This was passed through at such a rate that the ammonia remained in contact with the column for an average period of time of 3 minutes. In other words, the effluent was collected at the rate of 40 cc. per minute. The first 400 cc. of effluent were colorless. They were discarded. Then the elutriate came to have a deep red color. The ammonia addition was continued until the effluent became brown in color, at which time the addition of ammonia was discontinued and the column was washed with a little water.

The deeply red colored fraction of the elutriate was treated with steam or concentrated to dryness to volatilize the ammonia.

The residue of polyamino acids and some monoamino acids was neutralized to approximately pH 4 with hydrochloric acid although any convenient organic or mineral acid would be satisfactory. Any insoluble material was removed by filtration. The solution, which was still colored, was decolorized with carbon.

This solution was then evaporated to dryness. Analysis showed that the residue obtained contains approximately 30% of lysine, 16% of histidine, and 13% of arginine.

The column of resin was then treated with 4% sulfuric acid until almost all of the ammonia was removed, as indicated by the failure to form a precipitate when 2 cc. of this elutriate was added to 2 cc. of 2% phosphotungstic acid in 5% sulfuric acid. The column was then washed with a little water and drained, after which it was ready for the next run.

Example 2

The column of exchanger was saturated with basic amino acids of blood hydrolysate and these were then removed from the column with 5% ammonium hydrolysate as under Example 1, the elutriate so obtained being used as the amino acid fraction, evaporated, redissolved, neutralized, and purified as described above. The column was then washed thoroughly with water. The exchanger was then ready for the next treatment with a fresh supply of the hydrolysate.

In this case, however, the pH of the initial effluent of the said blood hydrolysate is around pH 10. As the column loses ammonia and becomes saturated with polyamino acids, the exchanger mass shrinks 5 to 15% in volume and the pH of the effluent falls from approximately 10 to below 4, at which latter point the column is again saturated with polyamino acids.

The remainder of the procedure was the same as described in Example 1.

Example 3

Histidine is isolated from corn steep water as follows: 200 gr. of the steep water concentrate were hydrolyzed with 67 cc. of concentrated sulfuric acid at a temperature of 108° C. in about 24 hours. Enough water was then added to bring the volume to 500 cc. The greater part of the sulfuric acid was then removed by adding cream of lime to establish a pH of 2.4. The resulting precipitate of calcium sulfate was removed and washed. This solution which contained 5,200 mgs. of aminoacid nitrogen was passed through the ion exchange resin column described above.

The histidine was liberated from the exchanger by passing a 1% solution of ammonia through the column. The dark red elutriate alone was collected. This elutriate was evaporated to dryness to remove the ammonia. The ammonia free residue was adjusted to pH 3–4 by the addition of hydrochloric acid and the solution was decolorized with charcoal. The colorless solution was evaporated to dryness. The residue recovered contained more than 50% by weight of histidine.

If the protein is hydrolyzed with alkali (baryta) or a series of proteolytic enzymes, the tryptophane is not destroyed and it may be adsorbed and desorbed from the synthetic zeolite in the same way as other polyamino acids.

Example 4

This and the following Example 5 illustrate procedures that are particularly effective in separating, from mixed histidine, arginine and lysine, a fraction in which the polyamino content is rich in histidine and another fraction which is very high in arginine and lysine.

In these procedures, the exchanger is saturated with histidine, arginine and lysine, as by passing a solution of these three materials under proper conditions over the exchanger and then washing with water, all as described previously herein.

The saturated and washed exchanger is then eluted with an aqueous solution of a water soluble, weak organic base. This base desorbs histidine much more readily than arginine and lysine. The exchanger, after the desorption by the organic base, is then eluted with dilute ammonium hydroxide solution as described above to remove the arginine and lysine.

More specifically, the exchanger supported as a column is saturated with mixed amino acids and then washed with about an equal volume of water as described, for instance, in Example 1. The material of the column is then percolated with an aqueous solution of pyridine, say in 3% to 50% concentration and suitably 5% to 15%, the solution being passed through the column at the rate of approximately 1.5 parts by weight of the pyridine solution for 1 part of the exchanger per minute.

The desorption of the histidine is so effective that, when the material in the column has been thus eluted by passage thereover of 10 times its volume of the aqueous solution of pyridine, approximately 60% of the histidine will have been desorbed and will appear in the liquid phase. The desorption then slows down so that 30 additional volumes of the pyridine solution are required to remove the next 30% of the total histidine originally used and 30 more volumes to remove nearly but not quite all of the remaining 10%. When these results are plotted, it is found that within the limits of experimental error the points lie on a typical asymptotic curve, this being the shape of curve for desorption.

For most purposes it is not necessary to continue the elution with the pyridine beyond the stage at which most of the histidine has been removed.

In any event the column is drained at the conclusion of the pyridine elution and the combined fractions of elutriate are suitably subjected to distillation, to recover the pyridine for reuse in the next run.

It will be found that approximately half of the total nitrogen in the residue is histidine nitrogen and the remainder is largely monoamino acid nitrogen.

After the histidine along with incidental monoamino acids have thus been removed from the exchanger, the remaining material in the column is treated with an aqueous solution of ammonium hydroxide of concentration calculated as ammonia of 4%. This treatment is effected as described above with ammonium hydroxide solution of about that concentration and the details are as there given. The ammonia desorbs the arginine and lysine.

Example 5

The procedure of Example 4 is followed except that the amino acid solution used is one which is made by the acid hydrolysis of a common gluten, as, for instance, wheat gluten, followed by neutralization of the major part of the acidity with ammonia and crystallization under conventional conditions, to cause separation of glutamic acid, tyrosine, leucine, and phenylalanine.

The mother liquor from this crystallization is commonly known as gluten end liquor. It contains not only the polyamine acids histidine, arginine and lysine but also very large proportions of sodium and ammonium ions. The ammonium ion is replaced by sodium as by the addition of sodium hydroxide followed by distillation to volatilize ammonia.

The sodium ion is then precipitated by passing in hydrogen chloride gas to saturation. This causes crystallization on standing of a large part of the sodium ion as sodium chloride. Contrary to what was to have been expected on the basis of the solubility relations as commonly understood, the hydrogen chloride does not precipitate appreciable proportions of histidine, arginine or lysine.

The liquor remaining after removal of the salt is made up with water and then evaporated to dryness several times to reduce the hydrochloric acid content. Then it is passed over a sulfonated phenol aldehyde resin in manner and under conditions described in Example 1.

The column was then eluted with approximately 10 per cent pyridine in aqueous solution. As much pyridine as possible was removed from the column by draining. The column was then backwashed to reclassify and to remove sludge. The pyridine elutriate so obtained contained almost all the color of the gluten end liquor. The pyridine was removed by distillation and recovered. The residue was taken up in water. It contained 336 mg. of N.

The column was then eluted with 4 per cent aqueous ammonia at 10 cc. per minute. It required this quantity of ammonia to saturate the column. The column was washed with water. The ammonia was removed by concentration in vacuo, and the pale brown residue was taken up in water. This solution contained 233 mg. of N, of which approximately 30 per cent is lysine N, and 70 per cent is arginine.

The column was regenerated for reuse by washing with 400 cc. of 4 per cent HCl at 15 cc. per minute.

In place of the pyridine described in Examples 4 and 5, there may be used in those examples other like organic bases as, for instance, piperdine or any monoamino furane.

It is considered that a substantial part of the effect of the organic bases in the particularly effective desorption of histidine is due to mutual solubility relationships between the organic base and histidine.

It will be understood that the details given are for the purpose of illustration and that variations within the spirit of the invention are intended

What I claim is:

1. In the separation of essential polyamino from monoamino acids, the method which comprises passing an aqueous solution of the essential polyamino and monoamino acids over a solid, water-insoluble phenol formaldehyde sulfonic acid resin serving as a cation exchanger adjusted to the acid cycle until polyamino acids appear in substantial proportion in the effluent, this step causing the effluent to contain the monoamino acids and the exchanger to retain the major portion of the polyamino acids, elutriating the exchanger and polyamino acids retained thereon with an aqueous solution of ammonium hydroxide and continuing the elutriation until ammonium hydroxide appears in quantity in the elutriate, to liberate the polyamino acids, collecting in solution form the polyamino acids thus liberated, and then treating the elutriated exchanger with a solution of a regenerating acid to remove ammonium hydroxide and thus adjust the exchanger to the acid cycle and in condition for reuse with a fresh portion of the acidic solution of the polyamino and monoamino acids, the ammonium hydroxide which liberates the polyamino acids being itself more easily liberated by the regenerating acid than are the polyamino acids when the ammonium hydroxide elutriation is omitted.

2. The method described in claim 1, the said solution of an acid used to remove ammonium hydroxide being an acid protein hydrolysate solution serving to regenerate the exchanger and also saturate it with polyamino acids and the said aqueous solution of the amino acids being at approximately room temperature when contacted with the cation exchanger.

3. In the separation of essential polyamino from monoamino acids, the method which comprises passing an aqueous solution of a protein hydrolysate containing the polyamino and monoamino acids, of concentration 0.1 to 2 parts of total amino acids calculated as nitrogen for 100 parts of the solution, over a solid, water-soluble phenol formaldehyde sulfonic acid resin serving as a cation exchanger and adjusted to the acid cycle until polyamino acids appear in substantial proportion in the effluent, this step causing the effluent to contain the monoamino acids and the exchanger to retain largely the polyamino acids, elutriating the exchanger and polyamino acids adsorbed thereon with an aqueous solution of ammonium hydroxide to liberate the polyamino acids and continuing the elutriation until ammonium hydroxide appears in quantity in the elutriate, collecting in solution form the polyamino acids thus liberated, and then treating the elutriated exchanger with a solution of an acid to remove ammonium hydroxide and adjust the exchanger to the acid cycle for reuse with a fresh portion of protein hydrolysate.

RICHARD J. BLOCK.

REFERENCES CITED

The following references are of record in the file of this patent:

UNITED STATES PATENTS

| Number | Name | Date |
|---|---|---|
| 2,223,920 | Griessbach et al. | Dec. 3, 1940 |
| 2,230,641 | Findlay | Feb. 4, 1941 |
| 2,240,116 | Holmes | Apr. 29, 1941 |
| 2,354,172 | Myers et al. | July 18, 1944 |
| 2,375,164 | Bennett | May 1, 1945 |
| 2,375,165 | Nees et al. | May 1, 1945 |
| 2,388,195 | Vallez | Oct. 30, 1945 |
| 2,389,119 | Cantor | Nov. 20, 1945 |
| 2,405,574 | Gamma | Aug. 13, 1946 |
| 2,420,641 | Albertson et al. | May 20, 1947 |

OTHER REFERENCES

Griessbach, Melliand-Textilberichte, vol. 20, pages 577–579 (1939).

Freudenberg et al.: Naturwissenschaften, vol. 30, page 87 (1942).